(12) United States Patent
Sidduraj et al.

(10) Patent No.: US 12,341,893 B2
(45) Date of Patent: Jun. 24, 2025

(54) SYSTEMS AND/OR METHODS IMPLEMENTING HYBRID APPROACH USING JWT TOKEN AND SYMMETRIC HASHING

(71) Applicant: International Business Machines Corporation, Armonk, NY (US)

(72) Inventors: Malligarjunan Sidduraj, Chennai (IN); Madhavan Kidambi Varadan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 18/228,361

(22) Filed: Jul. 31, 2023

(65) Prior Publication Data
US 2025/0047488 A1 Feb. 6, 2025

(51) Int. Cl.
*H04L 9/32* (2006.01)
*G06F 9/54* (2006.01)

(52) U.S. Cl.
CPC ............ *H04L 9/3213* (2013.01); *G06F 9/547* (2013.01); *H04L 9/3242* (2013.01)

(58) Field of Classification Search
CPC ....... H04L 9/3213; H04L 9/3242; H04L 9/32; G06F 9/547; G06F 9/54
See application file for complete search history.

(56) References Cited

U.S. PATENT DOCUMENTS

| | | | | |
|---|---|---|---|---|
| 2015/0046327 | A1* | 2/2015 | Taupitz | G06Q 20/367 705/44 |
| 2020/0404573 | A1* | 12/2020 | Athlur | H04W 4/06 |
| 2021/0184853 | A1* | 6/2021 | Crowson | H04L 67/306 |
| 2023/0353362 | A1* | 11/2023 | Dyer | H04L 63/0861 |

OTHER PUBLICATIONS https://swagger.io/docs/specification/callbacks/; pp. 1-7; retrived Jul. 31, 2023.

(Continued)

*Primary Examiner* — Jung W Kim
*Assistant Examiner* — Howard H. Louie
(74) *Attorney, Agent, or Firm* — CANTOR COLBURN LLP; Nicholas Welling

(57) ABSTRACT

An API gateway receives, from an application, a callback-related request and a registration token including a callback URL usable by an API server to call the callback server and security data for the callback URL. If that token's signature is valid: the callback URL, the security data for the callback URL, and an identifier identifying the API and callback servers are stored; a replacement URL is generated using the identifier; and the replacement URL is registered with the API server. When the API server emits an event regarding a registered request: the security data is retrieved for the associated request; a secure token is generated using that data and event-related content; the callback URL is retrieved for the associated request; and the retrieved callback URL, the secure token, and event-related content are sent to the callback server. The callback server determines whether event-related content is trustworthy using the secure token.

25 Claims, 3 Drawing Sheets

(56) References Cited

OTHER PUBLICATIONS https://datatracker.ietf.org/doc/html/rfc7519; pp. 1-30; May 2015.
https://medium.com/adobetech/securing-push-notifications-in-mobile-apps-a23b6c20139e; pp. 1-16; Sep. 23, 2021.
https://jwt.io/; pp. 1-5; retrived Jul. 31, 2023.
https://documentation.softwareag.com/webmethods/compendiums/v10-5/C_API_Management/index.html#page/api-mgmt-comp-co-overview_create_rest_api.html; p. 1; retrived Jul. 31, 2023.
https://web.archive.org/web/20230117043509/metamug.com/article/callback-api.html ; pp. 1-4; Feb. 12, 2022.
https://www.redhat.com/en/topics/api/what-are-application-programming-interfaces; pp. 1-11; Jun. 2, 2022.
https://www.loginradius.com/blog/engineering/jwt-signing-algorithms/; pp. 1-6; retrieved Jul. 21, 2023.
https://auth0.com/docs/secure/tokens/json-web-tokens/json-web-token-claims; pp. 1-20; retrieved Jul. 31, 2023.
https://jwt.io/introduction; pp. 1-12; retrieved Jul. 31, 2023.

\* cited by examiner

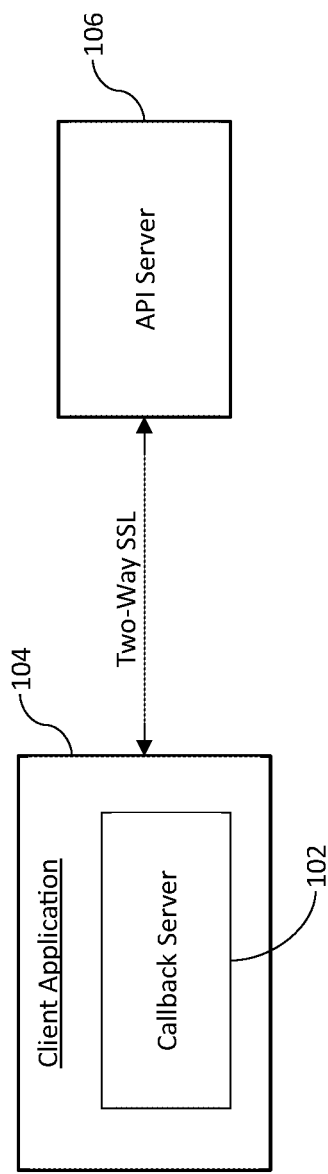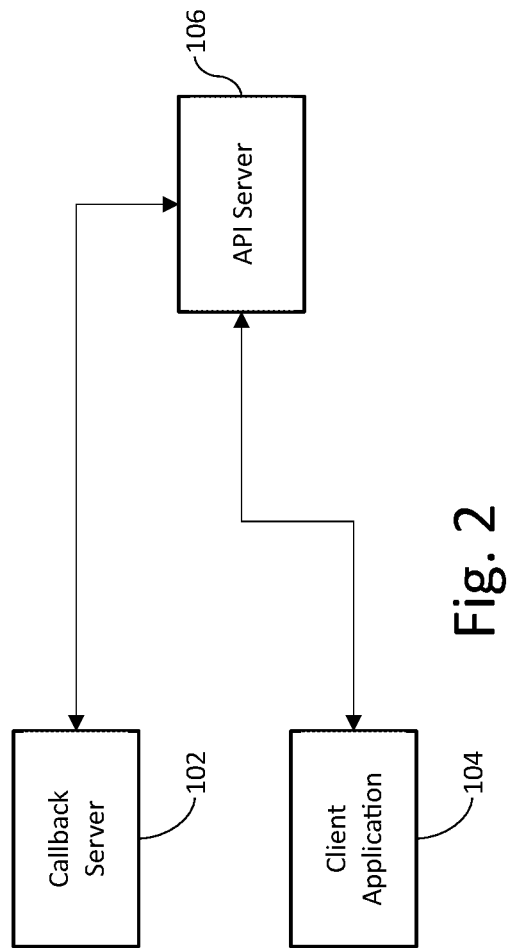

SYSTEMS AND/OR METHODS IMPLEMENTING HYBRID APPROACH USING JWT TOKEN AND SYMMETRIC HASHING

TECHNICAL FIELD

Certain example embodiments described herein relate to techniques for improving security in computer software applications. More particularly, certain example embodiments described herein relate to techniques for improving security in computer applications where Callback URL functionality is implemented.

BACKGROUND AND SUMMARY

An application programming interface (API) is a set of definitions and protocols that can assist with the building and integration of software applications. APIs can, for example, enable a given product or service to communicate with other products and services, e.g., without the given product or service needing to know implementation details of the other products and services. Using APIs, data can be shared among and between different applications, services, and external users. APIs can be public or private, and they can be used to integrate two or more applications or services in a variety of different computer architectures including, for example, distributed computing environments that make use of services or microservices.

Callbacks sometimes are used with APIs, e.g., in computer networks where one computer system may need to communicate with another computer system. Callbacks are asynchronous, out-of-band requests that a service can send to some other service in response to certain events. Using callbacks, a user can improve the workflow an API offers to its clients. For example, APIs can use callbacks to signal an event of interest and share data related to that event (including, for example, the mere fact that the event has occurred, attributes regarding the occurrence of the event, etc.). API clients that are interested in an event or data related to that event can include a Callback URL in the request they send to the API. Thus, as an example, callbacks can be used to provide subscription-related functionality. For instance, an automobile manufacturer might subscribe to events from its suppliers to know when components are manufactured and ready for assembly or sub-assembly, an e-shop could send a notification to a manager on each purchase, logistics operations could track environmental conditions associated with the transport of sensitive goods such as medicines, etc.

In a common computer-mediated communication pattern where callbacks are involved, a subscribe request is sent to a server from the client via a Callback URL including details of the subscribe request, and the server acknowledges the subscribe request. This server is an API Server, e.g., where the instrumentality provided by the API runs natively. Notifications sent in response to the subscribe request will be "out-of-band" in the sense that they will go through a connection other than the connection through which the client works. They also will be "asynchronous" in the sense that they will be out of the "regular" request-response flow. Thus, a server may (for example) send push notifications or the like asynchronously to the Callback URL sent by the client.

It will be appreciated that there are many other use cases where callbacks can be used to provide data or trigger action after an event. Other use cases include, for example, API redirects where a user is redirected to a different URL after requesting an API executes functionality successfully, techniques to avoiding polling, etc.

As those skilled in the art also will appreciate, the Callback URL that a client sends to an API for at least the initial request is dynamic in nature. Unlike API endpoints that are static and fixed, the Callback URL is not necessarily known beforehand and is evaluated at runtime based on the data supplied by the API-requesting client. To help address the dynamic nature of Callback URLs, an API Server may fetch the Callback URL (and details thereof) from a client request in accordance with a predefined definition. For instance, OpenAPI specifications define runtime expressions that can be used for the Server API to inform the client how it expects the client callback URL to be structured (e.g., specifying what data can be included therein and how that data can be included therein).

Because the Callback URL is dynamic in nature (and sent only during the request), there are technical challenges in protecting it. This unfortunately can lead to lead security concerns for callback handler clients. For instance, it is possible to spoof the API Server and send erroneous data, including incorrect values, to indicate the occurrence (or non-occurrence) of events, etc. Receiving erroneous data may be harmful for organizations (including mission critical operations in a variety of different industries). Data and/or events may be fabricated at a velocity sufficient to overwhelm the client computing system (similar to a denial-of-service (DOS) attack). Other data may trigger an exception that could be used to halt operations, inject malicious code, and/or the like. These and/or other computer security issues also can arise.

There are several ways that a client can handle callbacks from the API Server. In a first case, shown in FIG. 1, the Client Callback Server 102 runs on same Client Application 104 where the initial request for subscribe was received. In such cases, because the Callback Server 102 is in a sense "static" (e.g., because it is present as a part of the Client Application 104 itself), the Client Application 104 and API Server 106 both can use two-way mutual SSL or the like, e.g., by exchanging their keys. This provides at least some security. However, there are limitations imposed by the static nature of the Callback Server 102 and/or its configuration as a part of the Client Application 104 itself.

In a second case, shown in FIG. 2, the Client Callback Server 102 runs on totally different server, which is not related to the Client Application 104 (or the server on which it runs). In the FIG. 2, approach, two-way SSL communication between the parties is not feasible because the API Server 106 has no real direct communication with the Callback Server 102 because the Client Application 104 just shares the Callback URI (Uniform Resource Identifier) for the Callback Server 102 during the subscribe request and does not include other information regarding the Callback Server 102, which would be needed to establish two-way SSL communication between the API Server 106 and the Callback Server 102. In other words, in some cases, the API Server 106 does not know about the Callback Server 102 at all until it receives some basic URI-type information from the Client Application 104—and even then, the information received is quite limited. Further, because of the dynamic nature of the callbacks, a more static security configuration (e.g., leverage private and public certificates) is not technically straightforward for the API Server 106: Because the Client Application 104 can use multiple callback servers (not shown in FIG. 2), additional overhead would be required to maintain which security configuration (e.g., which key pair) to use with which callbacks.

One partial solution is to provide two-way SSL between the Client Application 104 and the API Server 106, and to encrypt data that the API Server 106 sends to the Callback Server 102. But there are still disadvantages associated with this approach. These disadvantages relate to the use of two-way SSL, and the complexity associated with an additional encryption implementation. With regard to the latter, the use of encryption increases the overhead required for the Callback Server 102, and the use of encryption with push notifications and other communication patterns adds complexity (which can be particularly disadvantageous for real-time feeds, for example).

Consider the following example real-time scenario, in which two autonomous robots (Robot 1 and Robot 2) in an automated "smart factory" request information from a central server regarding whether material for transport and/or processing is available.

Because there is no single application that responds to this request for Robot 1 and Robot 2 (e.g., because they use proprietary coding, have different operating systems, receive different inputs in different ways, etc.), separate applications (Robot1App and Robot2App) are built in this example. In other examples, a single application may be built but there may be two different instances of that application running, e.g., on different devices. Each of these two different applications has REST API endpoints to be called when there is an update of interest. These applications would need an API Server that would alert them when material for transport and/or processing is available.

In this example, the central server cannot be accessed directly (e.g., because the central server is not configured to accept callback URLs, because the central server may be a mainframe or other component that can only be accessed by an intermediary, etc.). Thus, developers responsible for developing Robot1App and Robot2App look for applications that could accept their application URLs as alert receiver endpoints (Callback URLs) to automate the feedback process. Assume that the developers find an Application Server called RobotAppServer that may be used for this purpose. In this example, the Application Server RobotAppServer has a REST API that accepts inputs including material that robots are interested in, material status (e.g., percent complete or the like), and alert receiver endpoint data.

After receiving information from Robot1App and Robot2App, RobotAppServer would register with the central server the alert receiver endpoints to be called when there is a material status change. For each of Robot1App and Robot2App, at least the following would be performed: (1) an alert receiver with logic to receive status updates would be implemented, and (2) a subscription to the RobotAppServer API would be registered so that Robot1App and Robot2App can receive alert notifications for material with the alert receiver endpoint as the callbacks.

With this general setup, it would be desirable to protect the alert-receiving endpoints (callbacks) in Robot1App and Robot2App, e.g., such that the apps react only on valid notifications sent from the central server. Left unprotected, the alert notification endpoints could be invoked improperly and damage could be caused, e.g., as outlined above. In this scenario, material might arrive at the wrong time or not at all, the wrong materials might be processed or shipped, manufacturing errors might occur, product defects might be caused, etc.

Visually, this architecture would resemble FIG. 2, with Robot1App and Robot2App taking the place of Callback Server 102, RobotAppServer taking the place of Client Application 104, and the central server taking the place of the API Server 106. Drawing parallels to the disadvantages explained above, then, it is noted that the central server does not have insight into the Robot1App and Robot2App applications, as the RobotAppServer shares the Callback URI during the subscribe request and does not share other information about these applications. Here, there are multiple applications, and the Robot1App and Robot2 applications do not know about the central server static security configuration. Also, because the RobotAppServer should maintain details of the Robot1App and Robot2App applications, there is added overhead to maintain which pair of keys to use to with which application in the event that some other security mechanism is attempted.

Thus, it will be appreciated that it would be desirable to provide enhanced security in cases where callbacks are implemented. Certain example embodiments help address the above-described and/or other concerns.

In certain example embodiments, a system for securing callbacks generated by an API server in response to a callback-related request from a client application for a callback server is provided. The system comprises an API gateway. The API gateway comprises a data store; and at least one processor configured to perform operations. The callback-related request and a registration token including data specifying a callback URL usable by the API server to call the callback server and data specifying how the callback URL is to be secured are received from the client application. The registration token is structured to include a header, a payload, and a signature. The signature of the received registration token is validated. In response to a determination that the signature of the received registration token is valid: stored to a data store are details regarding the callback-related request to a data structure in the data store, the details regarding the callback-related request including the callback URL, the data specifying how the callback URL is to be secured, and an identifier that identifies the API server and the callback server; a replacement URL is generated based on the identifier; and the replacement URL is sent to the API server to register the callback-related request with the API server. In response to receipt of an event emitted by the API server in response to a registered callback-related request: the data specifying how the callback URL is to be secured is retrieved for the registered callback-related request associated with the received event; a secure token is generated based on the data specifying how the callback URL is to be secured for the registered callback-related request associated with the received event, and content for the event; the callback URL for the registered callback-related request associated with the received event is retrieved; and the secure token and the content for the event are sent to the callback server via the retrieved callback URL. The callback server is configured to determine whether the content for the event is trustworthy based on the secure token.

In certain example embodiments, there is provided a method for securing callbacks generated by an API server in response to a callback-related request from a client application for a callback server. The method comprises: receiving, at an API gateway and from the client application, the callback-related request and a registration token including data specifying a callback URL usable by the API server to call the callback server and data specifying how the callback URL is to be secured, wherein the registration token is structured to include a header, a payload, and a signature; and validating the signature of the received registration token. In response to a determination that the signature of the received registration token is valid, the method comprises: storing details regarding the callback-related request, the details regarding the callback-related request including the callback URL, the data specifying how the callback URL is to be secured, and an identifier that identifies the API server and the callback server; generating a replacement URL based on the identifier; and sending the replacement URL from the API gateway to the API server to register the callback-related request with the API server. In response to receipt of an event emitted by the API server in response to a registered callback-related request, the method comprises: retrieving the data specifying how the callback URL is to be secured for the registered callback-related request associated with the received event; generating a secure token based on the data specifying how the callback URL is to be secured for the registered callback-related request associated with the received event, and content for the event; retrieving the callback URL for the registered callback-related request associated with the received event; and sending, to the callback server, via the retrieved callback URL, the secure token and the content for the event. The callback server is configured to determine whether the content for the event is trustworthy based on the secure token.

In certain example embodiments, there is provided a non-transitory computer readable storage medium tangibly storing instructions that, when executed by at least one processor of an API gateway, perform the method specified in the prior paragraph, etc.

In certain example embodiments, there is provided an API gateway system configured to secure callbacks generated by an API server in response to a callback-related request from a client application for a callback server. The API gateway comprises a data store. At least one processor is configured to perform operations comprising: receiving, from the client application, the callback-related request and a registration token including data specifying a callback URL usable by the API server to call the callback server and data specifying how the callback URL is to be secured, wherein the registration token is structured to include a header, a payload, and a signature; and validating the signature of the received registration token. In response to a determination that the signature of the received registration token is valid: stored to a data store are details regarding the callback-related request to a data structure in the data store, the details regarding the callback-related request including the callback URL, the data specifying how the callback URL is to be secured, and an identifier that identifies the API server and the callback server; a replacement URL is generated based on the identifier; and the replacement URL is sent to the API server to register the callback-related request with the API server. In response to receipt of an event emitted by the API server in response to a registered callback-related request: the data specifying how the callback URL is to be secured is retrieved for the registered callback-related request associated with the received event; a secure token is generated based on the data specifying how the callback URL is to be secured for the registered callback-related request associated with the received event, and content for the event; the callback URL is retrieved for the registered callback-related request associated with the received event; and the secure token and the content for the event are sent to the callback server via the retrieved callback URL. The callback server is configured to determine whether the content for the event is trustworthy based on the secure token.

According to certain example embodiments, the data specifying how the callback URL is to be secured may include a secret key of the callback server and a hashing algorithm.

According to certain example embodiments, the payload of the registration token may include the secret key and the hashing algorithm.

According to certain example embodiments, the secret key and the hashing algorithm may be private claims in the payload of the registration token.

According to certain example embodiments, the secure token may be generated by hashing (a) a hash of an event payload for the event, and (b) a hash of the secret key for the for the registered callback-related request associated with the received event, and each hash may be performed using the hashing algorithm specified in the payload of the registration token.

According to certain example embodiments, the secret key may be generated by the client application for the callback server.

According to certain example embodiments, the identifier may be usable as a key to the data structure.

According to certain example embodiments, the registration token may be signed with a public key of API Gateway and a private key of the Client Application According to certain example embodiments, the API gateway may be configured to process a plurality of callback-related requests from a plurality of client applications for a plurality of callback servers, and details regarding the plurality of callback-related requests may be stored to the data store.

According to certain example embodiments, the callback server may be configured to determine whether the content for the event is trustworthy based on the secure token by performing operations comprising recalculating a value for the secure token and determining whether the recalculated value matches the secure token.

According to certain example embodiments, the callback server may reside outside of the client application.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 1 is a first block diagram that helps explain certain security-related issues with callback technology implementations;

FIG. 2 is a second block diagram that helps explain certain security-related issues with callback technology implementations;

DETAILED DESCRIPTION

Figure 3:
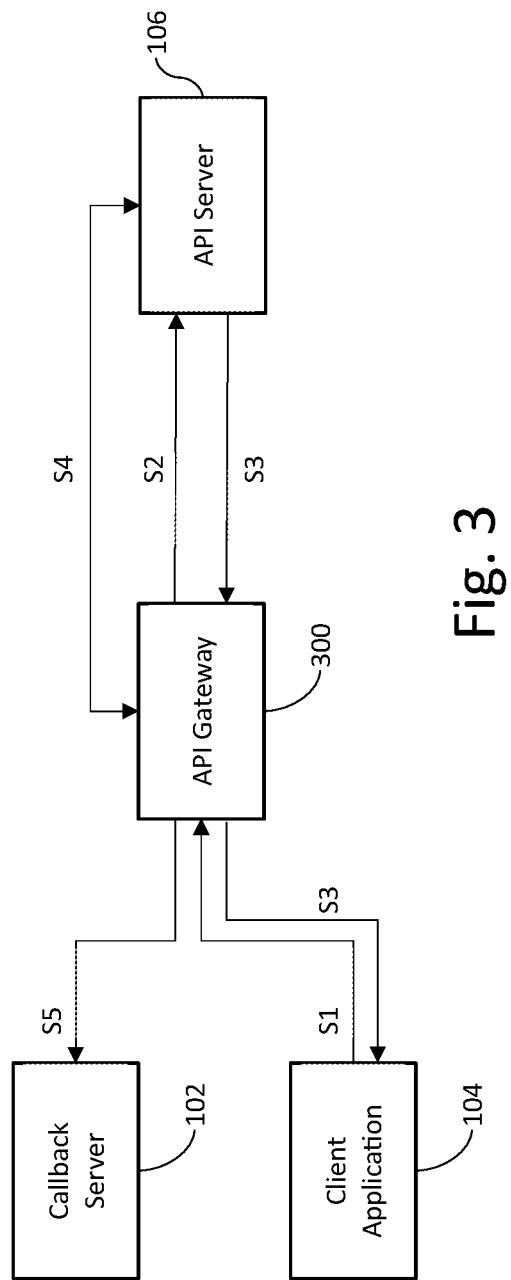
FIG. 3 is a block diagram illustrating a secure communication pattern of certain example embodiments.

Certain example embodiments relate to techniques for improving security in applications where Callback URLs are implemented in connection with APIs. More particularly, certain example embodiments use tokens to provide authentication for push or other notifications sent from an API Server to a Callback Server, e.g., as facilitated by an API Gateway as requested by a Client Application.

In certain example embodiments, JSON Web Token (JWT) technology is used to provide a layer of authentication and thus increase security. JWTs provide a standardized, compact, and self-contained way for securely transmitting information between parties. The information is transmitted as a JSON object. This information can be verified and trusted, at least to some extent, because it is digitally signed. JWT technology can be used by the API Server and the Callback Server to securely transmit transformation between the parties. In certain example embodiments, the digital signature is calculated using information from the header and information from the payload, making it technologically infeasible to tamper with the content. Although JWTs and JSON objects are mentioned, it will be appreciated that other token technologies (such as, for example, OAuth 2.0, HMAC, etc.) may be used with any structured or unstructured format (such as, for example, XML).

The tokens of certain example embodiments include multiple parts separated by a delimiter or otherwise distinguished from one another. In certain example embodiments, these parts may include (or be limited to) header, payload, and signature. In the case of JWT, these three parts are separated by dots ("."). In certain example embodiments, registration and secure tokens are used at different times to provide security for the overall system. For registration tokens, in certain example embodiments, the header section includes an encryption algorithm and the type of the token technology used, with the encryption algorithm being used to generate a signature for/to sign the token. It will be appreciated that any suitable encryption algorithm (e.g., HS256, RS256, etc.) can be used for encryption/signature purposes. The following example specifies RS256 as the encryption algorithm, and JWT as the type of token:

```
{
  "alg": " RS256",
  "typ": "JWT"
}
```

The token payload includes a set of "claims," which are statements asserted about an entity (typically, at least the client) and additional data. JWT supports registered, public, and private type claims. The name of the entity about which the claim is made is provided. The subject (sub) also may be specified, as may a flag indicating whether the entity is an administrator. In addition to subject, other registered claims may include issuer of the token, audience (recipient for which the token is intended), expiration time, a time before which the token must be not accepted for processing, a time at which the token was issued, and a unique identifier. Public claims may be available for "public consumption," whereas private claims may be used to share information specific to an application. An example payload is as follows:

```
{
  "sub": "1234567890",
  "name": "John Doe",
  "admin": true
}
```

In certain example embodiments, the signature is calculated as a hash of header information and payload information. Optionally, the delimiter may be included in the hash. In the following example, RSA using SHA256 is used to encode the header and the payload, together with a delimiter. The secret key of the Callback Server also is used, as discussed in greater detail below.

```
RSASHA256(
    base64UrlEncode(header) + "." +
    base64UrlEncode(payload))
```

It is noted that a non-mandatory secret key also may be used to sign the token. By contrast, the secret key discussed below is used to verify communications between the Client Application and the Callback Server.

The discussion above uses a registration token for authentication, which can help with securing API invocation. However, as discussed above, there are three types of parties involved (namely, the Client Application, API Server, and Callback Server), and token-based authentication by itself does not provide full security in this environment. Certain example embodiments therefore use this token-based authentication in connection with an API Gateway to help secure the Callback Server(s). The use of an API Gateway also helps reduce overhead for other components, as the API Gateway maintains information about the encryption, API endpoints and callbacks, etc.

More particularly, in certain example embodiments, communications (including communications between the Client Application and API Server, and communications between the API Server and Callback Server) are proxied with an API Gateway and are secured in different ways. In certain example embodiments, the proxying API Gateway may be thought of as involving the following communication patterns:

- Client Application <–> API Gateway <–> API Server
- API Server <–> API Gateway <–> Callback Server

The description that follows concentrates on the bolded links, which are secured. In other words, these communication links include secure communication between the Client Application and the API Gateway (which happens with a token-based approach), and secure communication between the API Gateway and the Callback Server (performed in connection with a secure mechanism discussed in greater detail below).

FIG. 3 is a block diagram illustrating a secure communication pattern of certain example embodiments. Referring once again to the example smart factory scenario discussed above for purposes of explanation, there are three parties including the RobotAppServer which is the Client Application 104, Robot1App and Robot2App which are Callback Servers 102, and the central server which is the API server 106 (where functionality of the called API runs natively and thus is sometimes called a native server). In FIG. 3, the API Gateway 300 is interposed between the Callback Server 102 (Robot1App and Robot2App) and the API Server 106 (central server), and between the Client Application 104 (RobotAppServer) and the API Server 106 (central server).

Each of the components in FIG. 3 is supported by a computing system including one or more hardware processors operably coupled to a memory. The one or more hardware processors are configured to perform instructions (e.g., computer programs) stored in the memory, for example. These components in FIG. 3 are operable to communicate over a suitable network interface, e.g., to make API calls, receive information from the APIs, etc. FIG. 3 may have any network topology including, for example, a distributed computing network such as may be found in a cloud computing environment. As will be appreciated from the description herein, the API Gateway 300 acts as a policy enforcement point before forwarding requests to backend systems. Further, it will be appreciated that the term "API Server" is used to refer to a server that happens to implement or otherwise enable access to an API. The "API Server" thus may or may not be a specialized component in different example instances, so long as it implements or otherwise provides access to an API. For this reason, the API Server may be thought of being an API-providing server or the like.

With this architecture, the Client Application 104 sends a request to the API Gateway 300 in step S1. In some standard callback implementations, the Client Application 104 would merely send the Callback URL in any known way to the receiver, e.g., in the header or path, which are not secure.

Certain example embodiments, however, make the flow more secure. The Client Application 104, during its communication with the API Gateway 300, generates a token (e.g., a JWT token) with certain additional information as one or more private claims. The additional information includes a Callback URL, which is the URL used by the (native) API Server 106 to call the Callback Server 102 in the case of an event of interest transpiring. Optionally, additional information may be used to secure the callback related communication. For example, additional private claims may include the Callback Server's secret key and/or the Callback Server's hashing algorithm.

The Callback Server's secret key is a secret key to be used by the two parties (i.e., the Callback Server 102 and the API Gateway 300) and is related to certain pre-configuration activities that take place, e.g., involving the exchange of keys (e.g., as the Client Application 104 and the API Gateway 300 in certain example embodiments exchange their keys for JWT or other communications). This secret key is used, for example, in connection with a hashing algorithm (e.g., a symmetric hashing algorithm) that is discussed below in connection with step S4 and step S5. This secret key can be generated by the Callback Server 102 and shared with the Client Application 104, or vice versa. This secret key is sent to the API Gateway 300 by the Client Application 104, e.g., during the initial communication between the Client Application 104 and the API Gateway 300. The Callback Server's hashing algorithm is the hashing algorithm that will be used by the Callback Server 102 to verify the signature of the token.

It will be appreciated that other means for securing callback-related communication may be provided in place of, or in addition to, the techniques described herein may be used in different example embodiments.

Using a private claim (e.g., in a JWT token) to send this information has a number of advantages. For example, the API Gateway 300 need not have any prior knowledge about the Callback Server 102. Instead, the identity of the Callback Server 102 may be determined on-the-fly, e.g., based on information provided by the Client Application 104.

Once the token is generated, the Client Application 104 sends the request to API Gateway 300, along with the token as an authorization header. Thus, in certain example embodiments, the token is included as a part of the request. In certain other example embodiments, the token and the request are sent separately from one another. For instance, in the example scenario described above, Robot 1 and Robot 2 would subscribe to the RobotAppServer application and register their respective applications, Robot1App and Robot2App. This registration would include the sending of callback details to the RobotAppServer application from Robot1App and Robot2App.

Thereafter, the RobotAppServer application invokes the API Gateway 300 with the token, also including the Callback Server information.

The Client Application 104 and the API Gateway 300 are pre-configured with their public/private keys, such that validation of the token is possible. Because the Callback Server's secret is a part of a secure token, it is encrypted and added to the private claim. This encryption happens with the public key of the API Gateway 300 and a public key of the Client Application 104 in certain example embodiments.

An example token payload section for the Robot 1 Callback Server instance is as follows:

```
{
"sub": "Robot1App", // Public claim
"name": "Robot 1", // Public claim
"iat": 1516239022, // Public claim
//Private claims
"callbackURL":"http://robot1app.com/callback",
"secret": "3NukYPNAQZaRtFncANS6xQ==",
"algorithm": "sha256"
}
```

As is known for JWTs, "iat" specifies the time when the token was issued.

Similarly, an example token payload section for the Robot 2 Callback Server instance is as follows:

```
{
"sub": "Robot2App", // Public claim
"name": "Robot 2", // Public claim
"iat": 15122022, // Public claim
//Private claims
"callbackURL":"http://robot2app.com/callback",
"secret": "4GwHKC9Ml4LrQ4dgOSj2oA==",
"algorithm": "sha256"
}
```

In the above examples "secret": "3NukYPNAQZaRtFncANS6xQ==" and "secret": "4GwHKC9M14LrQ4dgOSj20A==", are the secrets that will be encrypted and sent to the API Gateway 300 that will be used for communication between the API Gateway 300 and the Callback Server 102.

The entire token for Robot1App, after adding the payload and the signature parts, may be represented as follows:

```
eyJhbGciOiJIUzI1NiIsInR5cCI6IkpXVCJ9.eyJzdWIiOiJNYWRoYXZhbkFwcCIsIm5
hbWUiOiJNYWRoYXZhbiIsImlhdCI6MTUxNjIzOTAyMiwiY2FsbGJhY2tVUkwiOiJodHR
wOi8vbWFkaGF2YW5hcHAuY29tL2NhbGxiYWNrIiwic2VjcmV0IjoiM051a1lQTkFRWmF
SdEZuY0FOUzZ4UT09IiwiYWxnb3JpdGhtIjoic2hhMjU2In0.6kpH9c0PH9wPe4xIbe1
65E5y3fJuAxkaqSU2hlg8n9k
```

Similarly, the entire token for Robot2App, after adding the payload and the signature parts, may be represented as follows:

```
eyJhbGciOiJIUzI1NiIsInR5cCI6IkpXVCJ9.eyJzdWIiOiJNYWxsaUFwcCIsIm5hbWU
iOiJNYWxsaSIsImlhdCI6MTUxMjIwMjIsImNhbGxiYWNrVVJMIjoiaHR0cDovL21hbGx
pYXBwLmNvbS9jYWxsYmFjayIsInNlY3JldCI6IjRHd0hLQzlNbDRMclE0ZGdPU2oyb0E
9PSIsImFsZ29yaXRobSI6InNoYTI1NiJ9.C2RKw4xGJ6rNvDV6swCPnT7GN8Olaj82_G
NrqRpfD-s
```

During the communication with the API Gateway 300, these tokens will be added to the list of HTTP headers. For different applications, different HTTP calls will be issued to the API Gateway 300. For Robot1App, the request may be represented as follows:

```
POST http://apigateway.com/callback
Authorization:Bearer
eyJhbGciOiJIUzI1NiIsInR5cCI6IkpXVCJ9.eyJzdWIiOiJNYWRoYXZhbkFw
cCIsIm5hbWUiOiJNYWRoYXZhbiIsImlhdCI6MTUxNjIzOTAyMiwiY2FsbGJhY
2tVUkwiOiJodHRwOi8vbWFkaGF2YW5hcHAuY29tL2NhbGxiYWNrIiwic2Vjcm
V0IjoiM051a1lQTkFRWmFSdEZuY0FOUzZ4UT09IiwiYWxnb3JpdGhtIjoic2h
hMjU2In0.6kpH9c0PH9wPe4xIbe165E5y3fJuAxkaqSU2hlg8n9k
```

Similarly, for Robot2App, the request may be represented as follows:

```
POST http://apigateway.com/callback
Authorization:Bearer
eyJhbGciOiJIUzI1NiIsInR5cCI6IkpXVCJ9.eyJzdWIiOiJNYWxsaUFwcCIs
Im5hbWUiOiJNYWxsaSIsImlhdCI6MTUxMjIwMjIsImNhbGxiYWNrVVJMIjoia
HR0cDovL21hbGxpYXBwLmNvbS9jYWxsYmFjayIsInNlY3JldCI6IjRHd0hLQz
lNbDRMclE0ZGdPU2oyb0E9PSIsImFsZ29yaXRobSI6InNoYTI1NiJ9.C2RKw4
xGJ6rNvDV6swCPnT7GN8Olaj82_GNrqRpfD-s
```

It is noted that the API Gateway URL remains unchanged. The different applications will be identified by the API Gateway 300 based on the token information.

claims from the token that is sent by the Client Application 104 to the API Gateway 300.

The following pseudo-code demonstrates how this mapping process may be implemented in connection with certain example embodiments.

```
1.   process (JWTToken token): wrappedURL
2.   validate(token)
3.   /* this method is assumed to return all the private claims
     present in the JWT token. * /
4.   private_claims[ ] = getPrivateClaims(token)
5.   secret = private_claims["secret"]
6.   decrypted_secret = decrypt(secret,APIGATEWAY_PRIVATE_CERT)
7.   callback_details["secret"] = decrypted_secret
8.   callback_details["url"] = private_claim["url"]
9.   callbach_detalis["algorithm"] = private_claim["algorithm"]
10.  random_number=generateRandomNumber(callback_details["url"])
11.  callback_map.put(random_number,callback_details)
12.  replacedURL = generateCallbackURL(random_number)
13.  return replacedURL
```

In step S2, the API Gateway 300 wraps client Callback URLs with its own URL so that the API server 106 can send the information to API Gateway 300. When the API Gateway 300 receives the token, it validates the token signature with the public certificate of the Client Application 104.

The API Gateway 300 is configured to support secure callbacks. This configuration in certain example embodiments involves the API Gateway 300 maintaining a map of Callback URL and the Callback Server details that it has received from the incoming token from the Client Application 104. The map is populated by extracting the private Line 2 validates the signature of the JWT token and ensures that it is received from the Client Application 104.

Line 4 reads the Callback URL details from the private claims of the JWT token.

Line 5-7 decrypt the secret the API Gateway 300 has received as a private claim and adds it to a list of callback details. Line 6 decrypts the secret in the claim with the private certificate of the API Gateway 300.

Line 10 generates a random number and adds it to the replaced URL, which will be used to uniquely identify the API Server 106 and the corresponding Callback Server 102.

Although a random number is mentioned, it will be appreciated that any unique or near unique number can be used in different example embodiments.

Line 11 adds the Callback Server 102 details created from line 7-9 in the map with the random number generated in line 10 as the key.

Line 12 generates the wrapped Callback URL for the API Server 106.

The replaced URL returned by the above algorithm is forwarded to the API server 106 in connection with the request.

In the example scenario, the API Gateway 300 receives the token from the RobotAppServer and extracts the Callback URL from the token of Robot1App as http://robot1app.com/callback and that of Robot2App as http://robot2app.com/callback. Assume 123456789 is the random number generated for Robot1App and 987654321 is the random number generated for Robot2App. The wrapped URLs that are sent to the (native) API Server 106 will look like http://gateway.com/123456789 and http://gateway.com/987654321 for Robot1App and Robot2App, respectively. With the private claims (sent in step S1), the secrets that are stored for Robot1App and Robot2App would be stored in the map after the decryption of the respective secrets.

It will be appreciated that any suitable data structure may be used for the map. Structured document types like JSON and XML documents may be used, for example. The data structure is stored in a non-transitory computer readable storage medium (e.g., a data store) of the API Gateway 300 so that it can be referenced easily.

In step S3, the API Server 106 sends the response back to the API Gateway 300, and the API Gateway 300 sends the response back to the Client Application 104, e.g., to confirm registration of the callback-related request at the API server.

In step S4, upon the occurrence of an event of interest, the API Server 106 emits information regarding the event back to replacement URL, which is generated by the API Gateway in step S2. In the example scenario, the Callback URLs are http://gateway.com/123456789 and http://gateway.com/987654321.

When a call is received at http://gateway.com/*, the API Gateway 300 tries to get the Callback Server details from the map it created in step S2 and tries to create a secure token that will be usable by the Callback Server 102. In certain example embodiments, the secure token is created by performing a hash of the input payload that is received from the (native) API Server 106 and a hash of the secret key as salt which is again hashed. That is, in certain example embodiments:

$$secure\ Token = hash\ (hash(payload) + hash(secret))$$

The following pseudo-code snippet represents this procedure. The input to the algorithm is the inputURL and the payload_native (payload received from the native API Server 106).

```
1. url_parts = inputURL.split(/)
2. random_number = url_parts[length-1]
3. callback_details = callback_map[random_number]
4. hash_algorithm = callback_details["algorithm"]
5. payload_hash = hash(payload_native,hash_algorithm)
6. secret = callback_details["secret"]
7. secret_hash = hash(secret,hash_algorithm)
8. return hash(payload_hash+secret_hash,hash_algorithm)
```

Line 1-3 of the algorithm retrieve the callback details from the map generated in step S2. Line 4 retrieves the hash algorithm from the map. Line 5 creates the payload hash, and line 6-7 create the secret-inclusive hash. Line 8 performs a second hash by hashing the results obtained in line 5 and line 7. The output of the token is now passed as an HTTP header with key x-callback-token. Also, the original Callback URL is obtained from the map, and the request is forwarded to the Callback Server 102.

In the example scenario, the central server would call the API Gateway during the event of interest (e.g., a material of interest becoming available), and the API Gateway will find the Callback URL from the map and create the secure token. For example, in accordance with the description above, the Callback URL for the random number 123456789 is http://robot1app.com/callback.

Assume that the central server sends the following payload:

```
payload = {
    "Material-name": "extruded-plastic-chassis",
    "status": "complete"
    "location": "Factory-1"
}
```

The token is now calculated as per the above algorithm (where "abracadabra" is the secret):

$$Sha256(Sha256(\text{payload}) + Shar256(\text{``abracadabra''})) =$$

$$ec26216d3c9958659edd212abe32ce5443dd3ee5f8d17c707aae0f74132d33db$$

This is now added to the HTTP call by the API Gateway 300:

```
POST http://robot1app.com/callback
x-callback-token:
    ec26216d3c9958659edd212abe32ce5443dd3ae5f8d17c707aae0f7413
    2d33db
{
    "Material-name": "extruded-plastic-chassis",
    "status": "complete"
    "location": "Factory-1"
}
```

In step S5, the API Gateway 300 forwards the event it has received from the API Server 106 to the Callback Server 102 with the generated secure token. The Callback Server 102 receives the message from the API Gateway 300 and validates whether the message it has received is from a trustworthy and reliable party.

Figure 4:
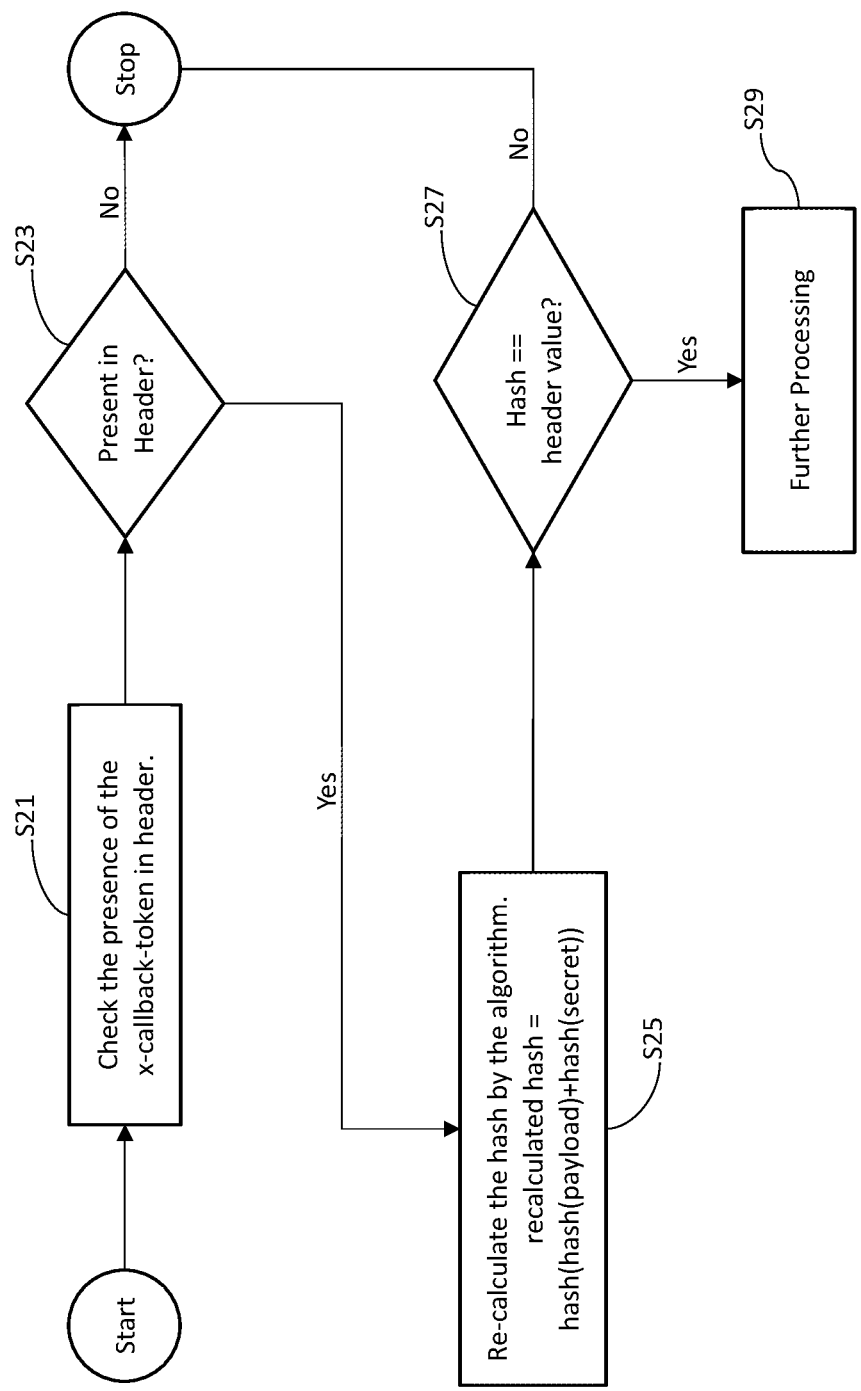
FIG. 4 is a flowchart showing steps implemented by a Callback Server for validating a request, in accordance with certain example embodiments.

FIG. 4 is a flowchart showing steps implemented by the Callback Server for validating the information received from the API Gateway, in accordance with certain example embodiments. As shown in FIG. 4, the process starts by the Callback Server in step S21 checking for the presence of the x-callback-token in the header of a received message. In step S23, a determination is made as to whether it is present. If not, the message may be deemed insecure and/or untrustworthy, and the process may be ended. This may involve discarding the message, quarantining the message for possible follow-up, alerting an operator, and/or the like.

If a determination is made that there is an x-callback-token in the header of the received message, then the hash is recalculated in step S25. In certain example embodiments, the hash is recalculated as the hash of the combined hash of the payload and the hash of the secret. In step S27, a determination is made as to whether this recalculated hash is equal to the header value. If not, then the process is stopped and actions that are the same as or similar to those identified above may be taken. On the other hand, if a determination is made that the recalculated hash is equal to the header value, then further processing of the message by the Callback Server is permitted in accordance with step S29.

The technical approach of certain example embodiments is advantageous. For example, the Callback Server's security configuration is dynamic, and it does not need to have knowledge about the API Gateway or the native API Server, e.g., prior to runtime, in order to help provide secure communications. Another example advantage relates to the use of private claims in the payload of the token (e.g., JWT token), which reduces the overhead of having separate two-way SSH handshakes and is a very extensible way to share data between the parties.

In certain example embodiments, the hashing algorithm that is proposed is a double hashing approach that combines two elements, namely, the payload and the secret. Even though the secret is a static component, the payload is a dynamic component. Therefore, the approach of certain example embodiments is resistant to brute force attacks. It will be appreciated that single-part hashing approaches may be used in certain example embodiments. In other example embodiments, multiple hashing approaches may be used (e.g., with salt being introduced from other factors such as, for example, timestamps, server names, entity names, and/or the like).

As still another example advantage, in certain example embodiments, multiple callback servers are configurable with different security configurations (e.g., different hashing algorithms, different levels of encryption, etc.), and the overhead of maintaining the information about them is at the API Gateway and does not involve the native API Server, which frees up resources on the API Server or at least allows it to focus on responding to valid requests in a secure communication pattern.

Although the term "Callback URL" is used herein, it will be appreciated that the format of the callback need not necessarily be a URL. To the contrary, any type of URI may be used for the callback. Thus, the term Callback URL should be interpreted to mean any identifier identifying a given (physical or virtual) resource unless otherwise specified.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for securing callbacks generated by an API server in response to a callback-related request from a client application for a callback server, the system comprising an API gateway, the API gateway comprising:
   a data store; and
   at least one processor configured to perform operations comprising:
   receiving, from the client application, the callback-related request and a registration token including data specifying a callback URL usable by the API server to call the callback server and data specifying how the callback URL is to be secured, wherein the registration token is structured to include a header, a payload, and a signature;
   validating the signature of the received registration token;
   in response to a determination that the signature of the received registration token is valid:
      storing details regarding the callback-related request to a data structure in the data store, the details regarding the callback-related request including the callback URL, the data specifying how the callback URL is to be secured, and an identifier that identifies the API server and the callback server;
      generating a replacement URL based on the identifier; and
      sending the replacement URL to the API server to register the callback-related request with the API server; and
   in response to receipt of an event emitted by the API server in response to a registered callback-related request:
      retrieving the data specifying how the callback URL is to be secured for the registered callback-related request associated with the received event;
      generating a secure token based on the data specifying how the callback URL is to be secured for the registered callback-related request associated with the received event, and content for the event;
      retrieving the callback URL for the registered callback-related request associated with the received event; and
      sending, to the callback server, via the retrieved callback URL, the secure token and the content for the event;
   wherein the callback server is configured to determine whether the content for the event is trustworthy based on the secure token.

2. The system of claim 1, wherein the data specifying how the callback URL is to be secured includes a secret key of the callback server and a hashing algorithm.

3. The system of claim 2, wherein the payload of the registration token includes the secret key and the hashing algorithm.

4. The system of claim 3, wherein the secret key and the hashing algorithm are private claims in the payload of the registration token.

5. The system of claim 2, wherein the secure token is generated by hashing (a) a hash of an event payload for the event, and (b) a hash of the secret key for the registered callback-related request associated with the received event, and wherein each hash is performed using the hashing algorithm specified in the payload of the registration token.

6. The system of claim 2, wherein the secret key is generated by the client application for the callback server.

7. The system of claim 1, wherein the identifier is usable as a key to the data structure.

8. The system of claim 1, the registration token is signed with a public key of the API Gateway and a private key of the Client Application.

9. The system of claim 1, wherein the API gateway is configured to process a plurality of callback-related requests from a plurality of client applications for a plurality of callback servers, wherein details regarding the plurality of callback-related requests are stored to the data store.

10. The system of claim 1, wherein the callback server is configured to determine whether the content for the event is trustworthy based on the secure token by performing operations comprising recalculating a value for the secure token and determining whether the recalculated value matches the secure token.

11. The system of claim 1, wherein the callback server resides outside of the client application.

12. A method for securing callbacks generated by an API server in response to a callback-related request from a client application for a callback server, the method comprising:
   receiving, at an API gateway and from the client application, the callback-related request and a registration token including data specifying a callback URL usable by the API server to call the callback server and data specifying how the callback URL is to be secured, wherein the registration token is structured to include a header, a payload, and a signature;
   validating the signature of the received registration token;
   in response to a determination that the signature of the received registration token is valid:
      storing details regarding the callback-related request, the details regarding the callback-related request including the callback URL, the data specifying how the callback URL is to be secured, and an identifier that identifies the API server and the callback server;
      generating a replacement URL based on the identifier; and
      sending the replacement URL from the API gateway to the API server to register the callback-related request with the API server; and
   in response to receipt of an event emitted by the API server in response to a registered callback-related request:
      retrieving the data specifying how the callback URL is to be secured for the registered callback-related request associated with the received event;
      generating a secure token based on the data specifying how the callback URL is to be secured for the registered callback-related request associated with the received event, and content for the event;
      retrieving the callback URL for the registered callback-related request associated with the received event; and
      sending, to the callback server, via the retrieved callback URL, the secure token and the content for the event;
   wherein the callback server is configured to determine whether the content for the event is trustworthy based on the secure token.

13. The method of claim 12, wherein the data specifying how the callback URL is to be secured includes a secret key of the callback server and a hashing algorithm.

14. The method of claim 13, wherein the payload of the registration token includes the secret key and the hashing algorithm.

15. The method of claim 13, wherein the secure token is generated by hashing (a) a hash of an event payload for the event, and (b) a hash of the secret key for the registered callback-related request associated with the received event, and wherein each hash is performed using the hashing algorithm specified in the payload of the registration token.

16. The method of claim 12, wherein the callback server is configured to determine whether the content of the event is trustworthy based on the secure token by performing operations comprising recalculating a value for the secure token and determining whether the recalculated value matches the secure token.

17. The method of claim 12, wherein the callback server resides outside of the client application.

18. A non-transitory computer readable storage medium tangibly storing instructions that, when executed by at least one processor of an API gateway, perform the method of claim 12.

19. The non-transitory computer readable storage medium of claim 18, wherein the callback server resides outside of the client application.

20. An API gateway system configured to secure callbacks generated by an API server in response to a callback-related request from a client application for a callback server, the API gateway comprising:
   a data store; and
   at least one processor configured to perform operations comprising:
      receiving, from the client application, the callback-related request and a registration token including data specifying a callback URL usable by the API server to call the callback server and data specifying how the callback URL is to be secured, wherein the registration token is structured to include a header, a payload, and a signature;
      validating the signature of the received registration token;
      in response to a determination that the signature of the received registration token is valid:
         storing details regarding the callback-related request to a data structure in the data store, the details regarding the callback-related request including the callback URL, the data specifying how the callback URL is to be secured, and an identifier that identifies the API server and the callback server;
         generating a replacement URL based on the identifier; and
         sending the replacement URL to the API server to register the callback-related request with the API server; and
      in response to receipt of an event emitted by the API server in response to a registered callback-related request:

retrieving the data specifying how the callback URL is to be secured for the registered callback-related request associated with the received event;

generating a secure token based on the data specifying how the callback URL is to be secured for the registered callback-related request associated with the received event, and content for the event;

retrieving the callback URL for the registered callback-related request associated with the received event; and sending, to the callback server, via the retrieved callback URL, the secure token and the content for the event;

wherein the callback server is configured to determine whether the content for the event is trustworthy based on the secure token.

21. The system of claim 20, wherein the data specifying how the callback URL is to be secured includes a secret key of the callback server and a hashing algorithm.

22. The system of claim 21, wherein the payload of the registration token includes the secret key and the hashing algorithm.

23. The system of claim 21, wherein the secure token is generated by hashing (a) a hash of an event payload for the event, and (b) a hash of the secret key for the registered callback-related request associated with the received event, and wherein each hash is performed using the hashing algorithm specified in the payload of the registration token.

24. The system of claim 20, wherein the callback server is configured to determine whether the content of the event is trustworthy based on the secure token by performing operations comprising recalculating a value for the secure token and determining whether the recalculated value matches the secure token.

25. The system of claim 20, wherein the callback server resides outside of the client application.

* * * * *